(12) United States Patent
Morita

(10) Patent No.: US 9,823,547 B2
(45) Date of Patent: Nov. 21, 2017

(54) DRIVE DEVICE FOR VIBRATING MEMBER, VIBRATION TYPE ACTUATOR USING THE SAME, AND IMAGING APPARATUS

(71) Applicant: CANON KABUSHIKI KAISHA, Tokyo (JP)

(72) Inventor: Hiromitsu Morita, Sakado (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/207,347

(22) Filed: Jul. 11, 2016

(65) Prior Publication Data

US 2017/0017137 A1    Jan. 19, 2017

(30) Foreign Application Priority Data

Jul. 14, 2015 (JP) ................................. 2015-140855

(51) Int. Cl.
| | |
|---|---|
| G02B 7/02 | (2006.01) |
| G03B 13/34 | (2006.01) |
| G02B 7/04 | (2006.01) |
| H02N 2/14 | (2006.01) |

(52) U.S. Cl.
CPC ............... *G03B 13/34* (2013.01); *G02B 7/04* (2013.01); *H02N 2/14* (2013.01)

(58) Field of Classification Search
CPC ............. G03B 13/34; G02B 7/04; H02N 2/14
USPC ................................................... 359/822–824
See application file for complete search history.

(56) References Cited

U.S. PATENT DOCUMENTS

2015/0180373 A1* 6/2015 Atsuta .................. H01L 41/042
359/824

FOREIGN PATENT DOCUMENTS

| JP | 2007-209179 A | 8/2007 |
|---|---|---|
| JP | 2009-089586 A | 4/2009 |

* cited by examiner

*Primary Examiner* — William Choi
(74) *Attorney, Agent, or Firm* — Canon U.S.A., Inc. IP Division

(57) ABSTRACT

When stopping a vibration type actuator at a final target stopping position, driving frequency and phase difference of AC signals input to a piezoelectric element are set in accordance with a first deviation obtained from a command position sequentially determined and a relative position of a vibrating member and driven element, and also pulse duty is adjusted in accordance with a second deviation obtained from a final target stopping position and the relative position.

24 Claims, 15 Drawing Sheets

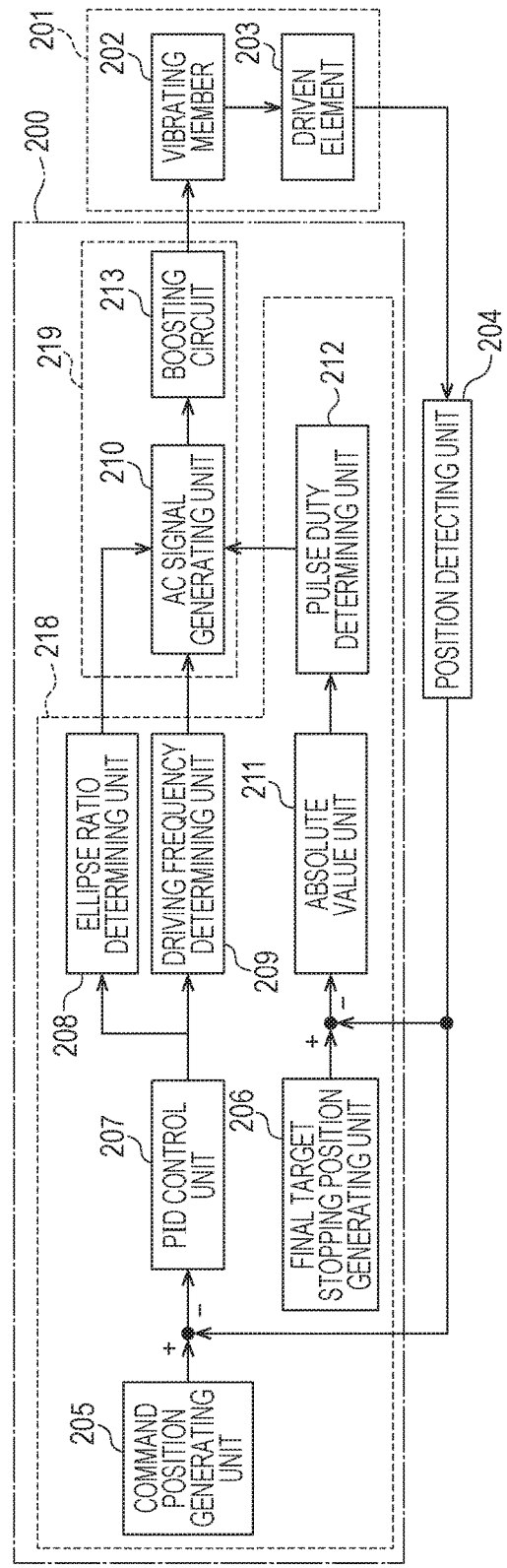
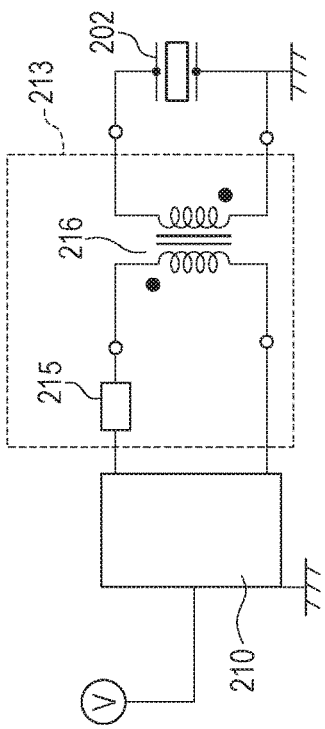
FIG. 2A
FIG. 2B

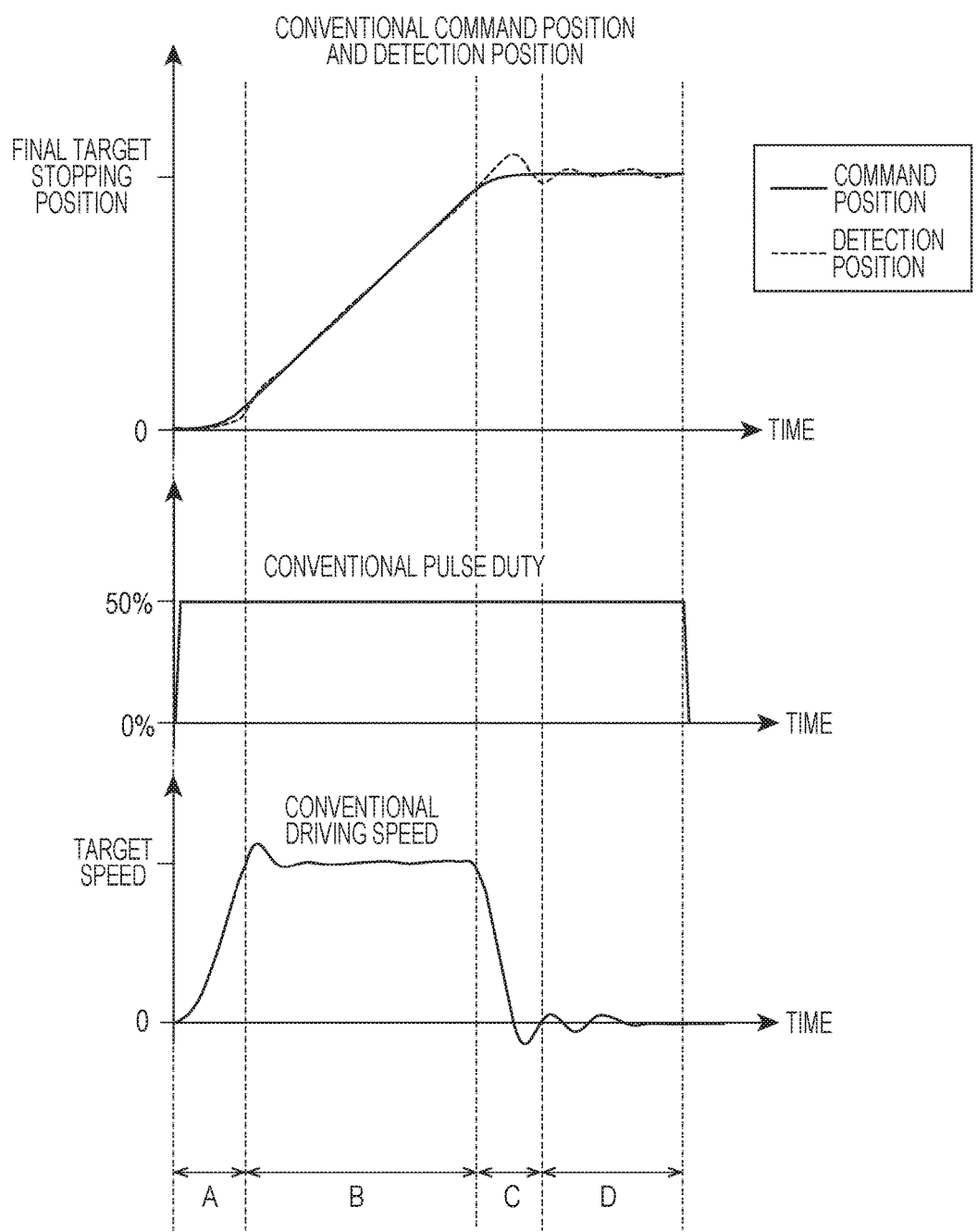

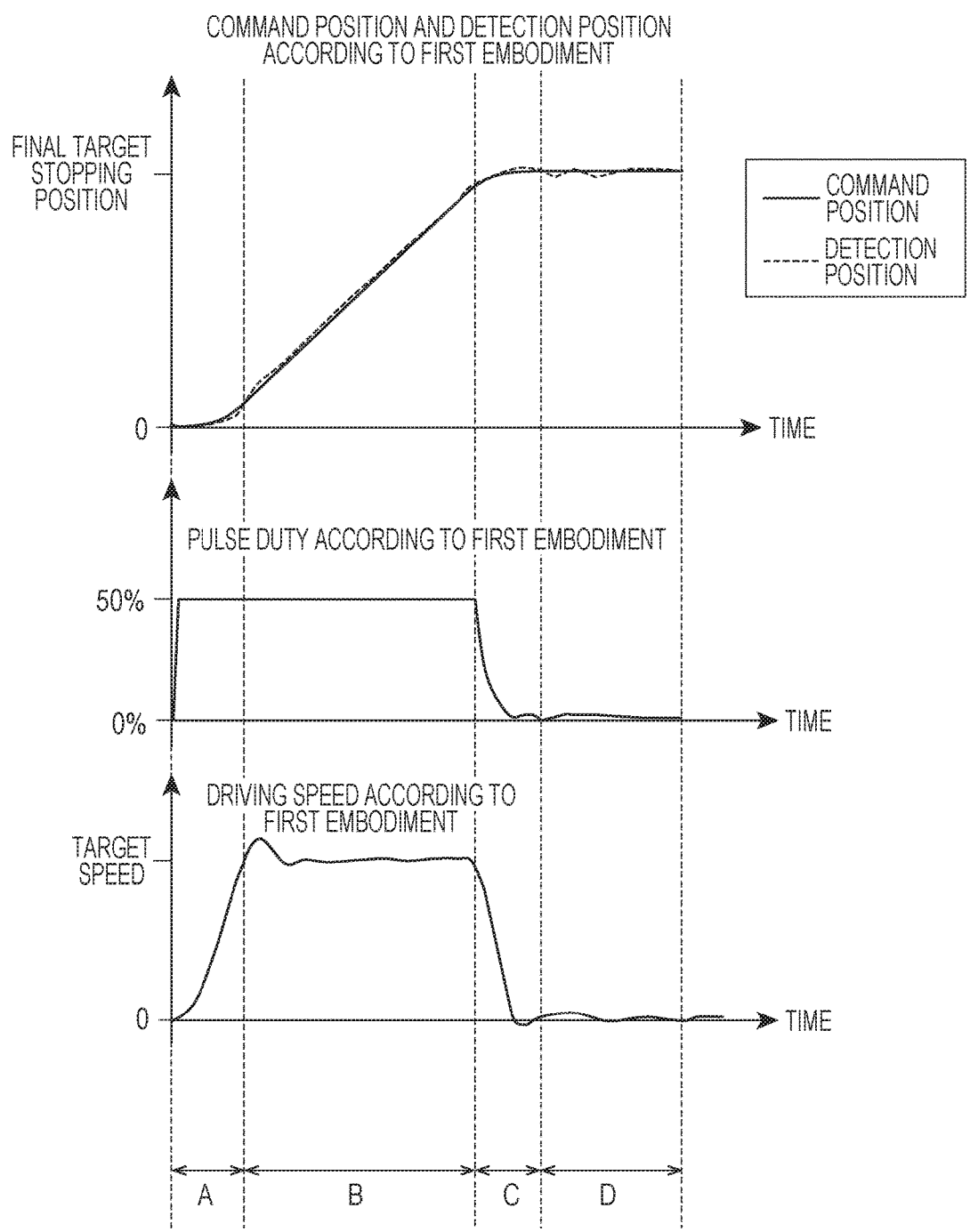

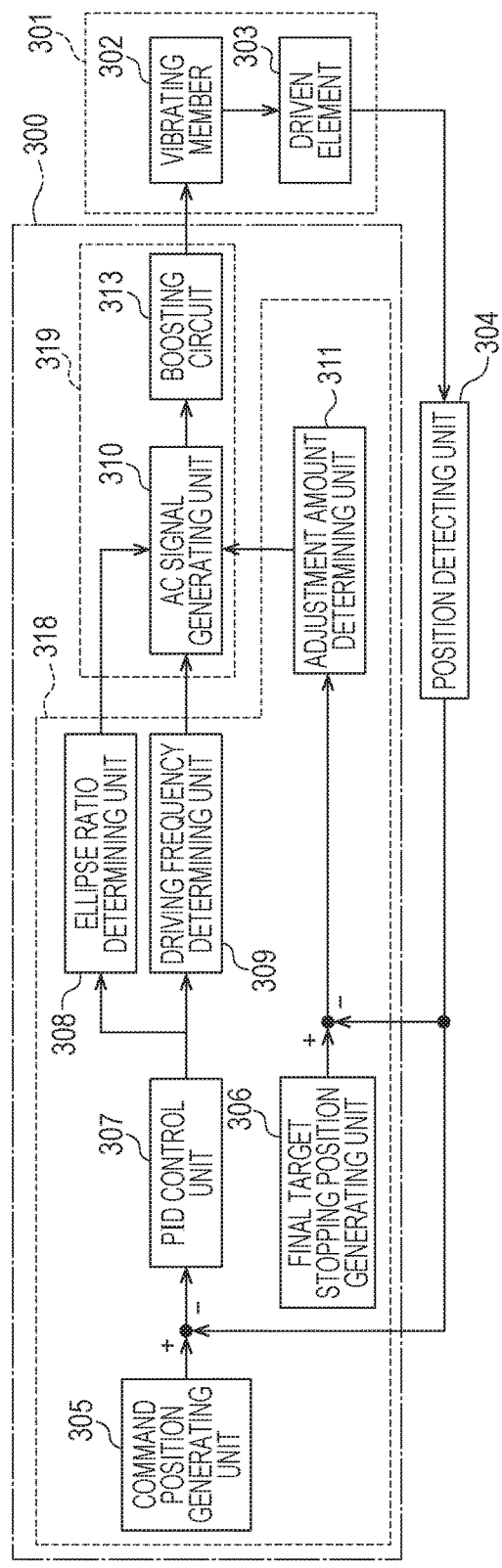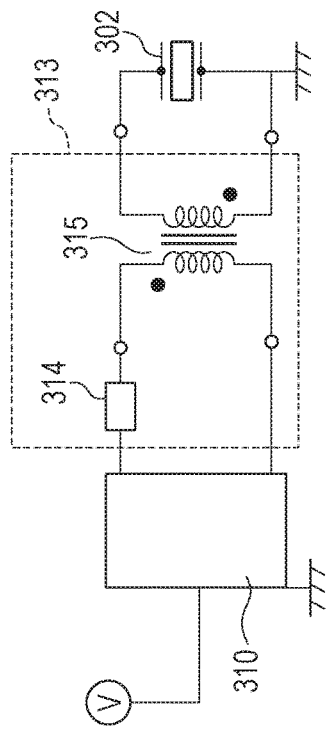
FIG. 8A
FIG. 8B

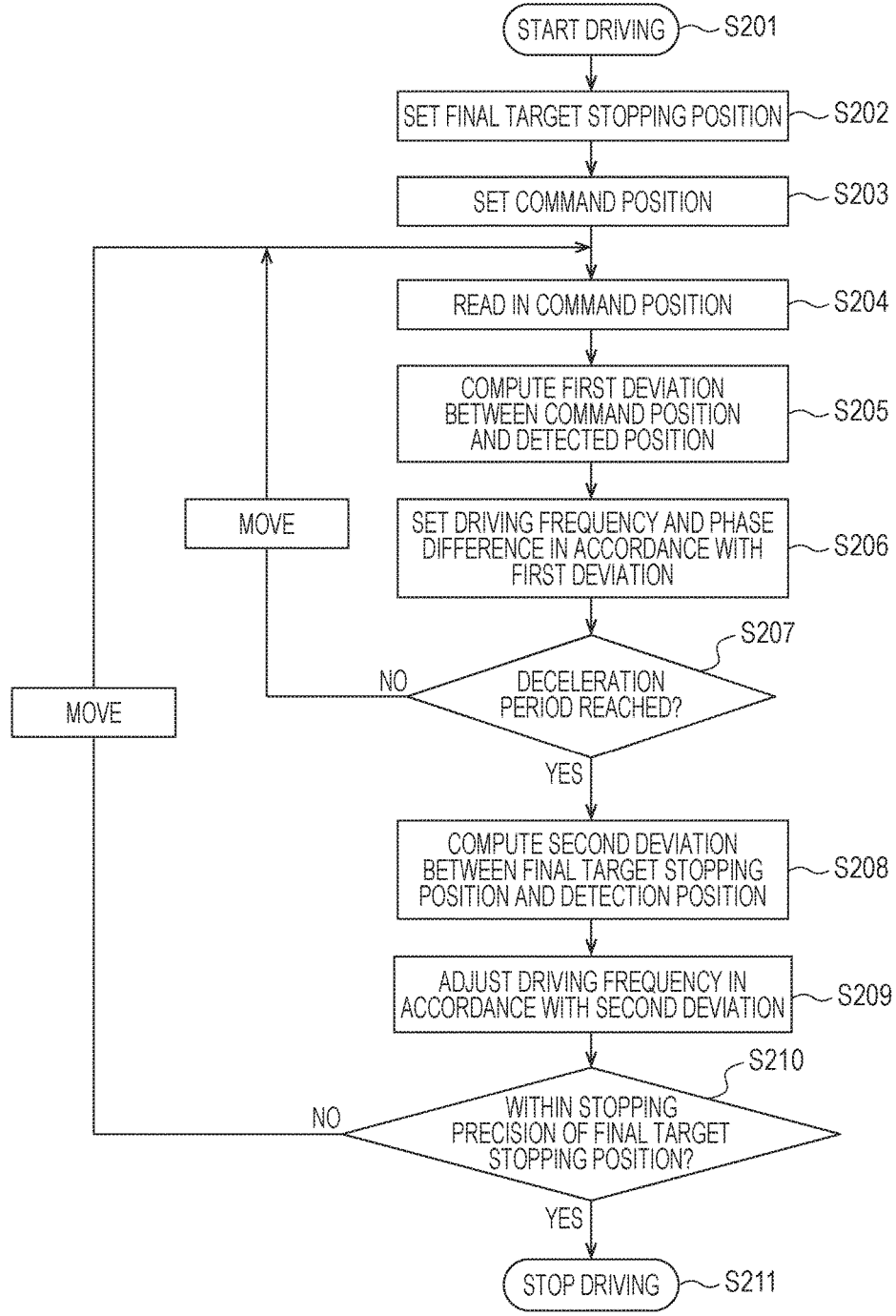

US 9,823,547 B2

DRIVE DEVICE FOR VIBRATING MEMBER, VIBRATION TYPE ACTUATOR USING THE SAME, AND IMAGING APPARATUS

BACKGROUND OF THE INVENTION

Field of the Invention

The present invention relates to a drive device for a vibrating member, a vibration type actuator using the same, and an imaging apparatus.

Description of the Related Art

Heretofore, various proposals have been made regarding a vibration type actuator that moves relative to a driven element by elliptical motion occurring at a predetermined mass point. For example, Japanese Patent Laid-Open No. 2009-89586 describes a control device of a vibration type actuator, where at least one of phase difference and voltage of driving signals input to the vibration type actuator is changed to perform speed control by changing the ellipse ratio of the elliptical motion, thereby improving positioning precision.

However, when stopping an object with great inertia by speed control such as ellipse ratio control, at a target position using a vibration type actuator, there is a possibility that marked overshooting of the target stopping position such as illustrated in FIG. 18. In this case, it will take time to stop at the target position.

SUMMARY OF THE INVENTION

According to one aspect of the present invention, a drive device of a driven element includes: a control unit comprising a command position generating unit configured to generate a command value relating to a relative position of a vibrating member and a driven element; and a drive unit configured to generate an elliptical motion at a part of the vibrating member, by input of AC signals to an electromechanical energy conversion element of the vibrating member. The control unit includes a first control unit configured to control at least one of phase and frequency of the AC signals, in accordance with a first deviation between the command value and the relative position, and a second control unit configured to control at least one of pulse duty of signals converted into the AC signals and frequency of the AC signals, in accordance with a second deviation between a final target stopping position of the relative position and the relative position.

According to another aspect of the present invention, a drive device of a driven element includes: a control unit comprising a command position generating unit configured to generate a command value relating to a relative position of a vibrating member and a driven element; and a drive unit configured to generate an elliptical motion at a part of the vibrating member, by input of AC signals to an electromechanical energy conversion element of the vibrating member. The control unit includes a first control unit configured to control amplitude of the elliptical motion in the driving direction of the vibrating member, in accordance with a first deviation between the command value and the relative position, and a second control unit configured to control amplitude of the elliptical motion in a direction perpendicular to the driving direction of the driven element, in accordance with a second deviation between a final target stopping position of the relative position and the relative position.

In the present specification, "command position" is also referred to as "first target position", and indicates a target position set for each predetermined time ($\Delta t$) in a series of control operations to move the relative position of the vibrating member and the driven element. The target position here may be the relative position of the vibrating member and the driven element, but may be the position of either the vibrating member or the driven element in a case where the position of the vibrating member or the driven element is detected by a detecting unit. Also, "final target stopping position" is also referred to as "second target position", and indicates a final target stopping position in the series of control operations regarding the relative position of the vibrating member and driven element. The final target stopping position may be the position of either the vibrating member or the driven element, or may be the relative position. Accordingly, the command position is set between the position of the vibrating member or the driven element at the time of starting control, to the final target stopping position. For example, a case will be considered the start position of the series of control operations of the vibrating member (or vibration type actuator) is 0, the final target stopping position is 10, and the command position is set at each $\Delta t$ from time t1 through t6. In this case, the target position can be set to 1 at a first time t1, 3 at t2, 5 at t3, 7 at t4, 9 at t5, and 10 at t6.

Also, "vibration direction of vibrating member" indicates the direction in which the relative position of the vibrating member and driven element change.

Further, "elastic member" indicates a member formed from metal or ceramics or the like, that curves by flexural vibration due to input of AC signals to a piezoelectric element.

Further features of the present invention will become apparent from the following description of exemplary embodiments with reference to the attached drawings.

BRIEF DESCRIPTION OF THE DRAWINGS

FIG. 2A is a block diagram of a vibration type actuator and drive device of a vibrating member according to a first embodiment.

FIG. 2B is a circuit diagram of the vibration type actuator and drive device of the vibrating member according to the first embodiment.

FIG. 6 is a diagram illustrating the relationship between command position and detection position, pulse duty, and driving speed, in a conventional drive device of a vibrating member.

FIG. 7 is a diagram illustrating the relationship between command position and detection position, pulse duty, and driving speed, according to the first embodiment.

FIG. 8A is a block diagram of a vibration type actuator and drive device of a vibrating member according to a second embodiment.

FIG. 8B is a circuit diagram of the vibration type actuator and drive device of the vibrating member according to the second embodiment.

FIG. 9 is a flowchart according to the second embodiment.

DESCRIPTION OF THE EMBODIMENTS

Embodiments of the present invention will be described below with reference to the drawings. Description of the embodiments will be made by way of an example where an electrode of an electro-mechanical energy conversion element is divided into two, and two-phase driving is performed where two AC signals with the same frequency and separately-controlled phases are input to the electro-mechanical energy conversion element. However, the drive circuit and vibration type actuator described in the present specification are not restricted to this.

First Embodiment

Figure 13:
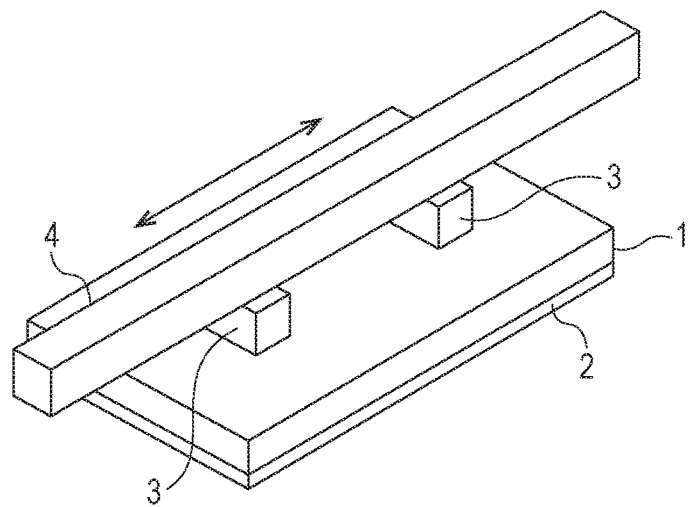
FIG. 13 is an external perspective view illustrating the basic configuration of a conventional vibration type actuator.

A configuration example of a vibrator driven in the present invention will be described with reference to FIG. 13. The vibrator of this vibration type actuator has an elastic member 1 formed from a metal material into a rectangular plate, with the rear face of the elastic member 1 being joined to an electro-mechanical energy conversion element. A piezoelectric element 2 is used as the electro-mechanical energy conversion element here. Multiple protrusions 3 are provided on the top face of the elastic member 1. According to this configuration, applying AC voltage (inputting AC signals) to the piezoelectric element 2 simultaneously generates secondary flexural vibration in the longitudinal direction of the elastic member 1 and primary flexural vibration in the lateral direction of the elastic member 1, exciting elliptical motion at the protrusion 3. Pressuring a driven element 4 against the protrusion 3 allows the driven element 4 to be linearly driven by the elliptical motion of the protrusion 3.

Figure 14:
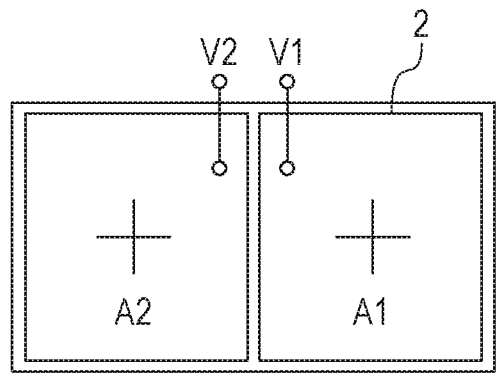
FIG. 14 is schematic diagram illustrating polarization regions of the piezoelectric element in the vibration type actuator in FIG. 13.
Figure 15A:
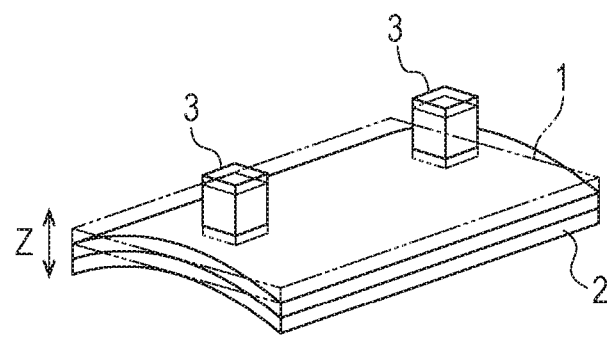
FIGS. 15A and 15B are perspective views illustrating vibration modes of the vibrating member.
Figure 15B:
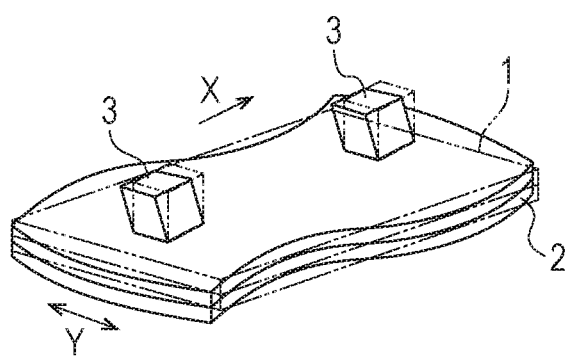

The piezoelectric element 2 has been subjected to polarization processing as illustrated in FIG. 14, and has two electrodes A1 and A2. AV voltages V1 and V2 of the same phase are applied to the two electrodes A1 and A2, thereby exciting primary flexural vibration in the rectangular elastic member 1, having two nodes and extending in a direction parallel to the longitudinal direction as illustrated in FIG. 15A. Applying AC voltages V1 and V2 of opposite phases to the two electrodes A1 and A2 excites secondary flexural vibration in the rectangular elastic member 1, having three nodes and extending in a direction parallel to the lateral direction as illustrated in FIG. 15B. Elliptical motion is exciting at the protrusion 3 by combination of the primary and secondary flexural vibration (vibration modes), and pressuring the driven element 4 in contact against the protrusion 3, allows the driven element 4 to be linearly driven.

Figure 16:
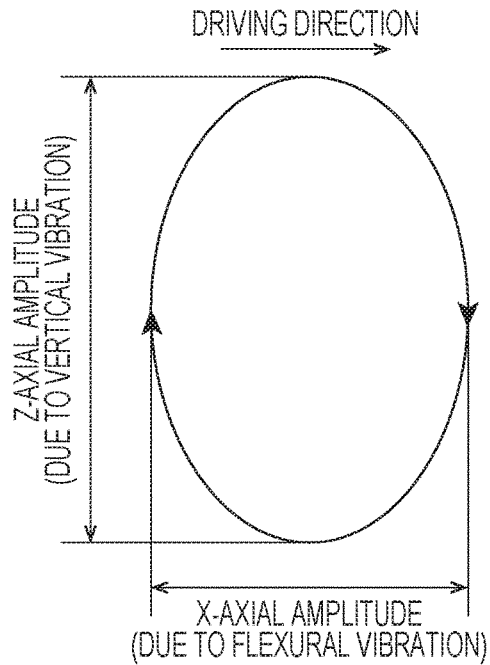
FIG. 16 is a diagram for describing elliptical motion excited at a protrusion of an elastic member.

Due to the primary flexural vibration illustrated in FIG. 15A, vibration is excited at the protrusion 3 where the amplitude of vibration changes in a direction perpendicular to the contact face in pressured contact with the driven element 4 (hereinafter referred to as "Z-axial amplitude"). Also, due to the primary flexural vibration illustrated in FIG. 15B, vibration is excited at the protrusion 3 where the amplitude of vibration changes in a direction parallel to the relative movement direction between the vibrating member and the driven element 4 (driving direction of the vibrating member) (hereinafter referred to as "X-axial amplitude"). By combining the primary flexural vibration and secondary flexural vibration, elliptical motion can be excited at the protrusion 3 as illustrated in FIG. 16, with the amount of deviation from 1 of a value indicating the ration between the Z-axial amplitude and X-axial amplitude representing the ellipse ratio. Changing the phase difference of the second AC signals input to the vibrating member, i.e., the AC voltage V1 and V2 applied to the electrodes of the vibrating member, so as to change the ratio between the X-axial amplitude and Z-axial amplitude, enables the ellipse ratio of the elliptical motion excited at the protrusion 3 to be adjusted. Also, changing the voltage amplitude of the second AC signals input to the vibrating member, i.e., the AC voltage V1 and V2 applied to the electrodes of the vibrating member, so as to change the magnitude of amplitude while maintaining the above ratio, enables the ellipse ratio of the elliptical motion excited at the protrusion 3 to be adjusted.

Figure 17:
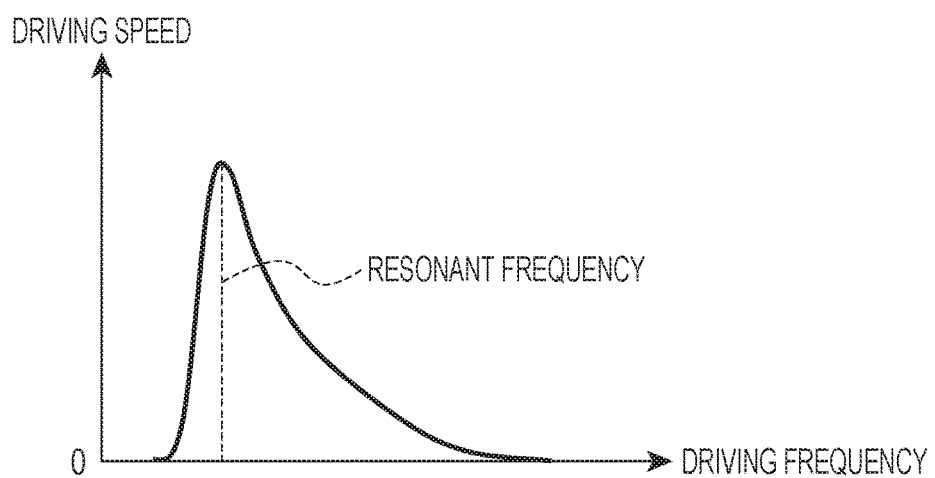
FIG. 17 is a diagram illustrating the relationship between the driving frequency and driving speed of the vibrating member.
Figure 18:
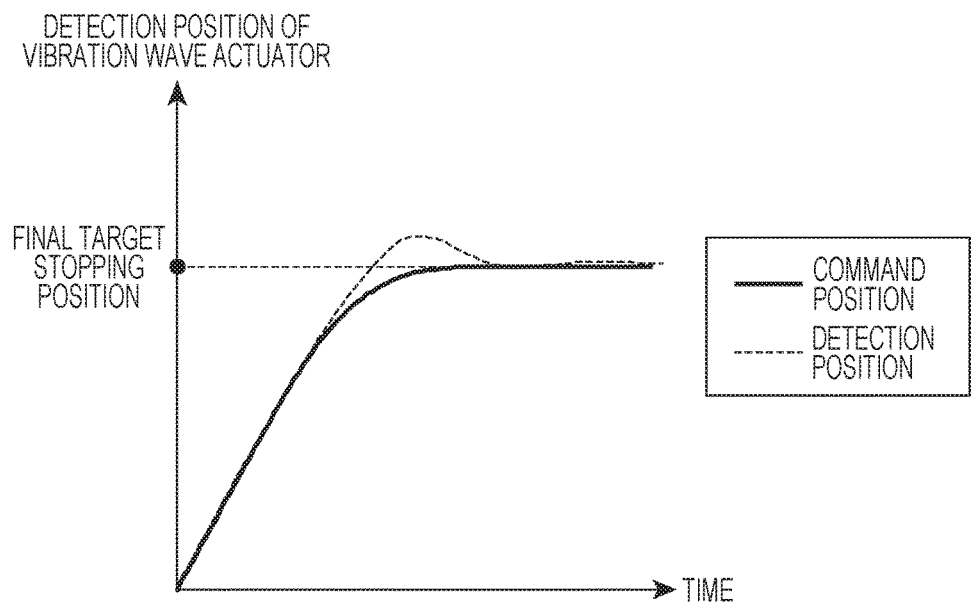
FIG. 18 is a diagram illustrating the relationship among the command position, the detection position of the vibrating member, and time.

Further, changing the frequency of AC voltage applied to the piezoelectric element 2 enables the magnitude of the ellipse to be changed while maintaining the ellipse ratio. The size of the ellipse becomes larger by approaching the resonance frequency of the vibrating member and the vibrating speed can be made faster. The size of the ellipse becomes smaller by moving the frequency of the applied AC voltage away from the resonance frequency of the vibrating member, and the vibrating speed can be made slower. For example, in a basic configuration of a vibration type actuator such as illustrated in FIG. 13, the relationship between driving frequency and driving speed is such as illustrated in FIG. 17. That is to say, the actuator properties are such that the resonance frequency of the vibrating member is the peak of driving speed, with the driving speed gradually dripping at the high-frequency side from the resonance frequency, and steeply dropping at the low-frequency side.

Speed control (frequency control) can be performed for a vibration type actuator by frequency, by changing the frequency of the two AC signals (AC voltage V1 and V2) input to the piezoelectric element 2. Speed control by phase difference (phase difference control) can also be performed by changing the phase of the second AC signals (AC voltage V1 and V2). Further, speed control by voltage (voltage control) can be performed by changing the magnitude of the voltage amplitude of the second AC voltages V1 and V2 applied to the piezoelectric element 2. Accordingly, speed control of the vibration type actuator can be performed by combining the above-described frequency control, phase difference control, and voltage control.

Figure 1A:
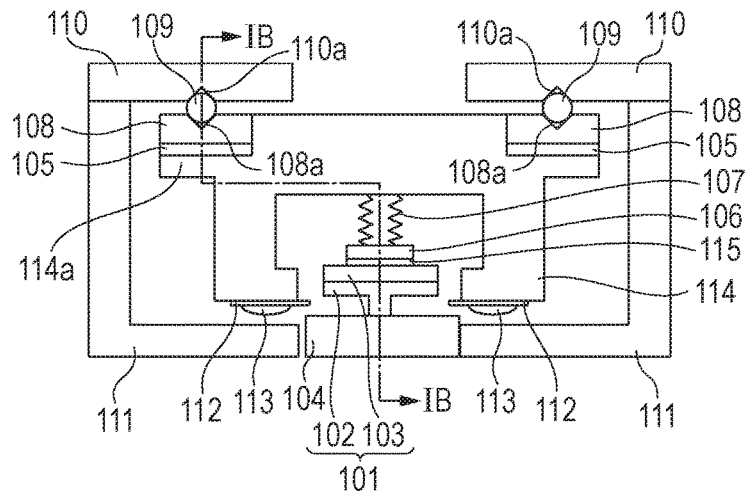
FIGS. 1A through 1C are diagrams illustrating an example of a vibration type actuator, and a drive device thereof.
Figure 1B:
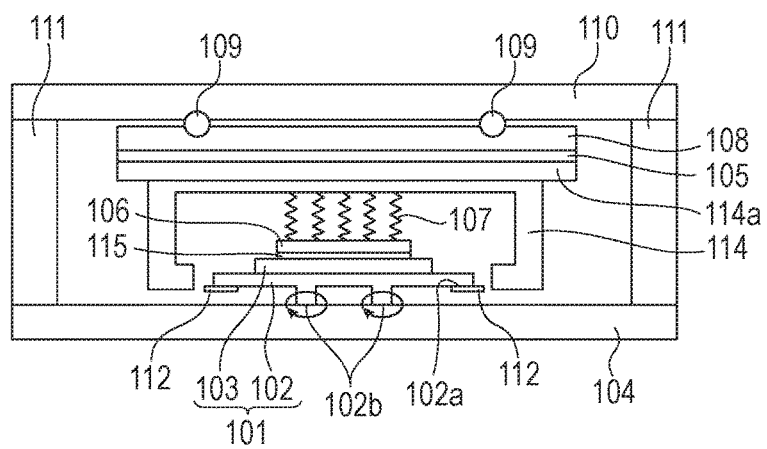
Figure 1C:
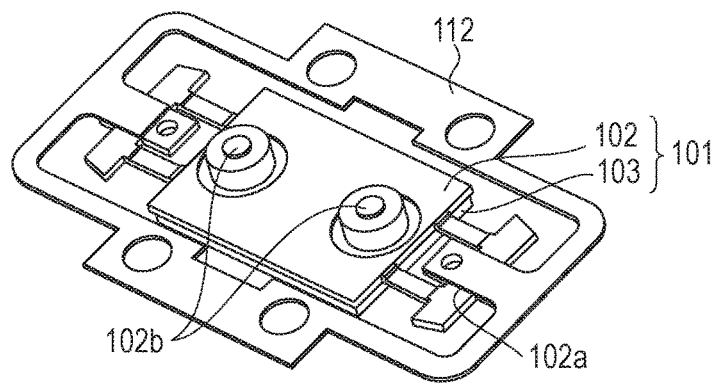

A drive device of a vibrating member will be described in the first embodiment of the present invention where the magnitude or ellipse ratio of elliptical motion generated at the protrusion 3 is adjusted by combining the primary flexural vibration illustrated in FIG. 15A and the secondary flexural vibration illustrated in FIG. 15B, thereby performing speed control. FIG. 1A is a cross-sectional diagram of primary portions of the vibration type actuator taken in a direction perpendicular to the driving direction, FIG. 1B is a cross-sectional diagram taken along the driving direction of the vibrating member, and FIG. 1C is a perspective diagram of the vibrating member to which a supporting member has been joined. Note that FIG. 1B is a cross-section taken along line IB-IB in FIG. 1A.

The vibration type actuator according to the present embodiment has a vibrator including a vibrating member comprising an electro-mechanical energy conversion element and elastic member, and a driven element in frictional contact within the vibrating member, and is configured so that the vibrating member and the driven element move relatively to each other. The vibrating member and the driven element moving relatively to each other may be either of a case where the vibrating member moves, and a case where both the vibrating member and the driven element move. That is to say, the vibration type actuator is configured so as to enable the relative position of the vibrating member and driven element to change.

These configurations will be described in detail. A vibrating member 101 has an elastic member 102 and a piezoelectric element 103 joined to the elastic member 102 by adhesion or the like. A joined portion 102a of the elastic member 102 is joined to a supporting member 112 by welding or the like (see FIGS. 1B and 1C). The piezoelectric element 103 is designed such that, upon high-frequency voltage being applied (AC signals being input), flexural vibrations occur in both the longitudinal direction and lateral direction of the vibrating member 101. As a result, the leading edges of protrusions 102b formed on the elastic member 102 as illustrated in FIG. 1B exhibit elliptical vibration. The direction of rotation and ellipse ratio can be changed as appropriate by changing the frequency and phase of the AC signals input to the piezoelectric element 103, thereby generating desired movement. Accordingly, the vibrating member 101 can be advanced and retreated along the optical axis (a direction perpendicular to the plane of the drawing in FIG. 1A, i.e., the horizontal direction in FIG. 1B, using the friction force between the vibrating member 101 and a slider 104 (driven member) that is a member relatively sliding thereupon. That is to say, the slider 104 and vibrating member 101 are configured such that the relative position to each other can be changed by friction contact.

A vibrating member fixing member 114 is configured to hold the vibrating member 101, and the supporting member 112 joined to the vibrating member 101 is fixed to an attachment position by screws 113, as illustrated in FIG. 1A. A pressuring unit has a pressuring plate 106 and a pressuring spring 107. The pressuring plate 106 is configured to press the vibrating member 101 against the slider 104 through felt 115 (vibration isolating member). The vibration isolating member functions to isolate vibrations thereat, with hardly any vibrations transmitted to the pressing unit, without impeding vibration of the vibrating member 101. The vibration isolating member is not restricted to being felt, and may be formed using sponge or the like. A moving plate 108 is fixed to contact portions 114a of the vibrating member fixing member 114 through a rubber sheet 105 (vibration damping member) by screws or the like, making up a part of a guide member that receives reactive force of the pressing force, and moves integrally with the vibrating member 101. Formed in the moving plate 108 are multiple V-shaped groove 108a, into which balls 109 that are rolling members are fit, guiding the vibrating member fixing member 114 in the optical axis direction. The balls 109 are disposed so as to roll in the direction of relative motion of the vibrating member 101 and slider 104. A pressing holding unit 110 is fixed by screw or the like to a frame 111, and is configured so as to press the balls 109 against the moving plate 108. The pressing holding unit 110 also makes up part of the guide member, and enables the vibrating member fixing member 114 to be supported so as to advance and retreat along the driving direction by holding the balls 109 by a V-shaped groove 110a formed at a position facing the V-shaped grooves 108a of the moving plate 108. Further, the moving plate 108 is configured so as to be movable in the driving direction (the direction perpendicular to the plane of the drawing in FIG. 1A) as to the pressing holding unit 110, by the rolling functions of the balls 109. Thus, the guide member is configured as described above to be capable of guiding the vibrating member 101 in the relative movement direction. Although omitted form illustration, a lens holder and focal lens are attached to the vibrating member fixing member 114 via a rack.

The slider 104 is fixed near both end portions in the longitudinal direction (driving direction here) of the frame 111 by screws or the like. Note that the V-shaped grooves 108a of the moving plate 108 and the V-shaped grooves 110a of the pressing holding unit 110 in FIG. 1A do not all have to be V-shaped, at least one may be in a plane shape. Also note that the specific configurations and operational principles of the vibrating member 101 may be configured the same as in FIG. 14, for example, as described above.

The drive device of the vibrating member according to the present embodiment will now be described with reference to FIGS. 2A and 2B. FIG. 2A is a block diagram illustrating the configuration of a vibration type actuator and drive device of a vibrating member according to the first embodiment, and FIG. 2B is a circuit diagram illustrating the configuration of the vibration type actuator and drive device of the vibrating member. A vibrator 201 has a vibrating member 202 and driven element 203, as illustrated in FIG. 2A. The driven element 203 is driven by elliptical motion excited at the protrusions of the vibrating member 202. A position detecting unit 204 detects the position of the driven element 203, and is configured as a linear encoder, for example.

The drive apparatus 200 according to the present embodiment has a control unit 218 and drive unit 219. The control unit 218 is configured to control second AC signals input to the vibrating member 202, based on the relative position of the vibrating member 202 and driven element 203. The drive unit 219 is configured to generate elliptical motion at part of the vibrating member 202, the protrusions in this case, by inputting the second AC signals to the vibrating member 202.

The control unit 218 includes a command position generating unit 205, a first elliptic shape control unit 220 (referred to as a first control unit), and a second elliptic shape control unit (pulse duty determining unit 212, referred to as a second control unit)). The command position generating unit 205 is configured to generate command values relating to a relative position (first target position) of the vibrating member 202 and driven element 203. The first elliptic shape control unit 220 is configured to control the amplitude of the elliptical motion in the driving direction of the vibrating member 202, in accordance with a first deviation that is the difference between the relative position of the vibrating member 202 and driven element 203 and the command value. The second elliptic shape control unit is configured to control the amplitude of the elliptical motion in a direction perpendicular to the driving direction of the vibrating member 202, in accordance with a second deviation that is the difference between the relative position of the vibrating member 202 and driven element 203, and a final target stopping position relating to the relative position.

Figure 3A:
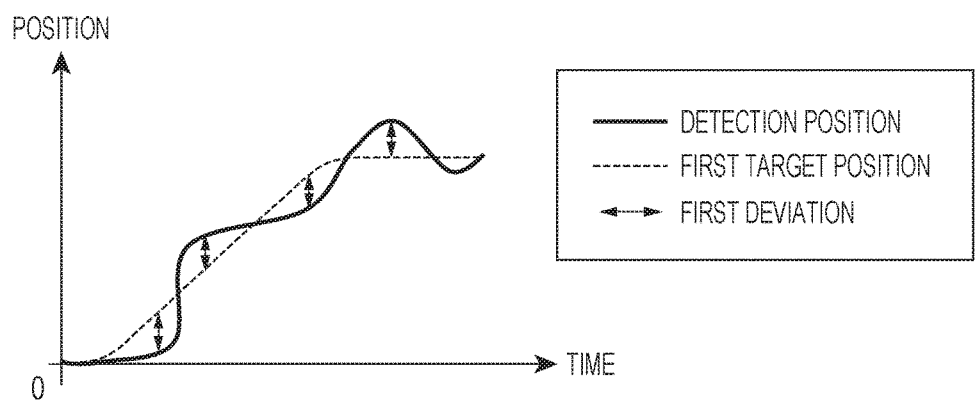
FIGS. 3A and 3B are explanatory diagrams regarding a first target position and a second target position.

Signals, relating to deviation between a command value relating to a first target position that is the output of the command position generating unit 205, and output of the position detecting unit 204, are input to a Proportional-Integral-Differential (PID) control unit 207. The first target position is a target position of a command that changes every unit time, as indicated by the dotted line in FIG. 3A, for example, and is set for position control, to move the driven element 203 or vibrating member 202 to the final stopping position. The deviation between the detection position of the position detecting unit 204 and the command value (first target position) is the first deviation in the present invention, as illustrated in FIG. 3A. The PID control unit 207 computes the operation amount of the vibration type actuator from this first deviation.

The first elliptic shape control unit 220 is connected to the output side of the PID control unit 207. The first elliptic shape control unit 220 has an ellipse ratio determining unit 208 that sets the ratio of the ellipse in the elliptical motion, and a driving frequency determining unit 209 that sets the size of the ellipse in the elliptical motion. The PID control unit 207 determines the operation amount of the vibration type actuator based on the command value generated at the command position generating unit 205. The ellipse ratio determining unit 208 determines the ellipse ratio, and the driving frequency determining unit 209 determines the driving frequency, both in accordance with the operation amount output from the PID control unit 207. The ellipse ratio obtained by computation at the ellipse ratio determining unit 208 can be controlled by controlling the phase difference of the second AC signals (AC voltage V1 and V2) applied to the piezoelectric element. The this phase difference is set to 90 degrees for example, as an upper threshold value, and if the driving direction is opposite, this phase difference is set to −90 degrees for example, as a lower threshold value. The output sides of the ellipse ratio determining unit 208 and driving frequency determining unit 209 are connected to an AC signal generating unit 210. The AC signal generating unit 210 can serve as a circuit generating AC signals (first AC signals) by switching, for example. The first AC signals generated from the AC signal generating unit 210 are input to a boosting circuit 213, and AC signals output from the boosting circuit 213 (second AC signals) are input to the vibrating member 202.

The control unit 218 is configured using a digital device such as a central processing unit (CPU) or a programmable logic device (PLD) including application specific integrated circuits (ASICs), an element such as a A/D converter, or the like. The AC signal generating unit 210 in the drive unit 219 has a CPU, function generator, and switching circuit, for example, and the boosting circuit 213 is configured including a coil and transformer, for example. Note that the control unit 218 and drive unit 219 are not restricted to being configured using one element or circuit, and may be configured using multiple elements and circuits. Any element or circuit may execute each processing.

The phase difference of AC signals in the present specification is 0 where the ellipse of the elliptical motion generated at the protrusions is a true circle. The farther the ratio of the driving direction component (feed direction component) of the elliptical trajectory as to the thrust direction component (directional component perpendicular to the face of the elastic member where the protrusions are formed) is from a true circle, the larger the phase difference is. Accordingly, the ellipse ratio of the elliptical motion generated at the protrusions can be increased by the phase difference of AC signals approaching the upper limit value or lower limit value away from 0. A larger ellipse ratio means the vibrating member 202 is driven faster.

In the present embodiment, in a case where the phase difference determined by the ellipse ratio determining unit 208 while driving of the vibrating member 202 is not at the upper limit threshold or lower limit threshold, the driving frequency determining unit 209 sets the driving frequency to the upper limit. The AC signal generating unit 210 generates first AC signals to generate two second AC signals having this driving frequency and phase difference.

Figure 3B:
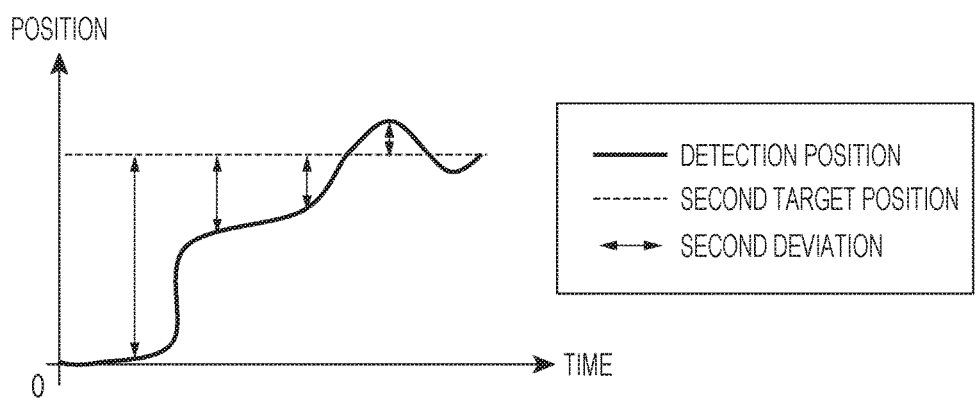

On the other hand, in a case where the phase difference determined by the ellipse ratio determining unit 208 while driving of the vibrating member 202 is at the upper limit threshold or lower limit threshold, the driving frequency determining unit 209 determines the driving frequency in accordance with the first deviation. The AC signal generating unit 210 generates two first AC signals having this driving frequency and phase difference. Note that the upper limit of the driving frequency here means the highest value of driving frequency bands used for driving the vibrating member 202 or a value close thereto. Signals relating to deviation between a second target position that is the output of a final target stopping position generating unit 206 and the output of the position detecting unit 204 are input to an absolute value unit 211. The second target position is a target position for the vibration type actuator to finally stop at when driving a focus lens, for example, as indicated by the dotted line in FIG. 3B. The deviation between the detection position of the position detecting unit 204 and the second target position is the second deviation in the present invention, as illustrated in FIG. 3B. The absolute value unit 211 gives the absolute value of this second deviation. The pulse duty determining unit 212, serving as the second elliptic shape control unit, is connected to the output side of the absolute value unit 211. The pulse duty determining unit 212 is configured to be able to set the pulse duty of the first AC signals generated at the AC signal generating unit 210. Setting the pulse duty of these AC signals sets the voltage amplitude of the second AC signals that are output in accordance with the set value. The upper limit threshold of the pulse duty is set to 50% here. The pulse duty determining unit 212 determines the rate of the pulse duty in accordance with the operation amount output from the absolute value unit 211.

That is to say, in the present embodiment the phase difference and driving frequency of AC signals are determined in accordance with the first deviation, and the pulse duty is adjusted in accordance with the second deviation, thereby controlling the speed of the driven element 203.

As described above, the boosting circuit 213 is connected to the output side of the AC signal generating unit 210. The boosting circuit 213 is configured including a coil 215 and transformer 216 as illustrated in FIG. 2B. The boosting circuit 213 boosts the two first AC signals generated by switching at the AC signal generating unit 210 to generate the second AC signals, and applies this to multiple electrodes of the piezoelectric element of the vibrating member 202.

Figure 4:
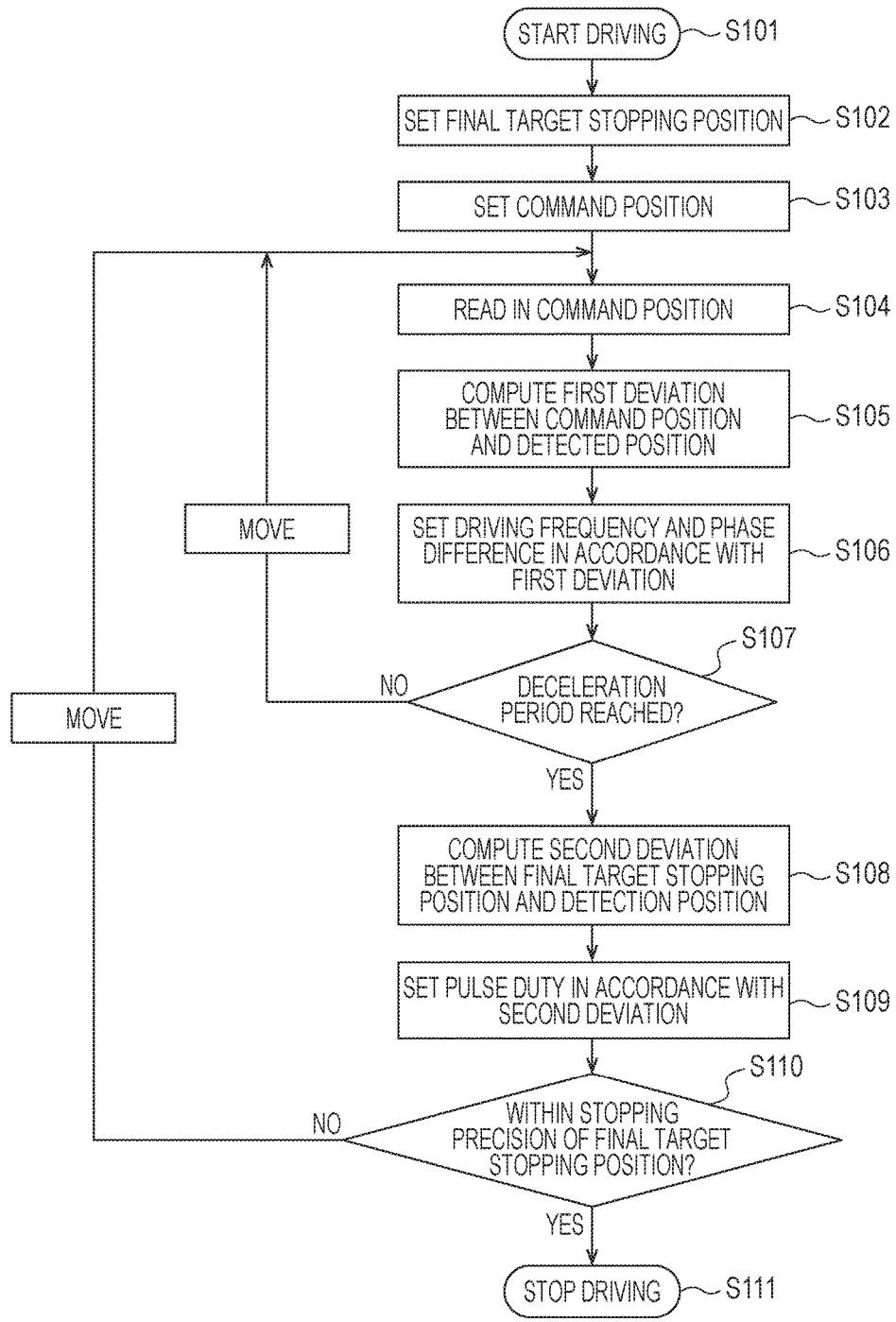
FIG. 4 is a flowchart according to the first embodiment.
Figure 5:
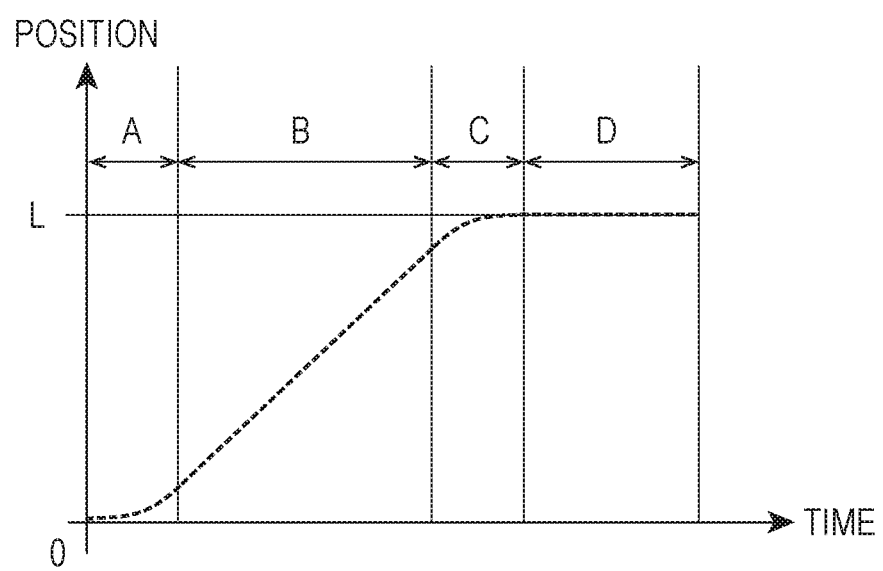
FIG. 5 is an explanatory diagram regarding command position, final target stopping position, and time.

Next, a specific example of control operations according to the first embodiment will be described with reference to FIGS. 4 and 5. FIG. 4 is a flowchart of control operations when performing focus lens driving of a camera, and FIG. 5 is a diagram describing the command position and final target stopping position.

As illustrated in FIG. 4, first, AC signals are input and control operations are started (S101). Next, the final target stopping position is set (S102). The final target stopping position is the above-described second target position, and is a position L in FIG. 5 where the driven element 203 (or vibrating member 202) finally stops when performing control driving of the vibrating member 202. Next, the command position (command value) is set (S103). The command position is the above-described first target position. The driving command is set so as to be made up of an acceleration period A where the driving speed of the vibrating member 202 (speed of movement of the driven element 203) is accelerated, a steady speed period B where the target speed is maintained, a deceleration period C where the speed is decelerated, and a stopping period D of stopping at the final target stopping position. The command position set every unit time (e.g., every Δt) is read in (S104), and this is compared with the detection position of the vibration type actuator and the first deviation is calculated (S105). The vibration type actuator is sequentially moved to the command position by changing the driving frequency and phase difference of AC signals by position feedback control such as PID control in accordance with this first deviation (S106).

Now, in the acceleration period A, the ellipse ratio of elliptical motion is determined by the ellipse ratio determining unit 208 in accordance with the first deviation, with the driving frequency remaining at the frequency when starting driving, which is the upper limit. The larger the absolute value of the ellipse ratio is, the faster the driving speed of the vibrating member is. Thereafter, the speed increases by increase in ellipse ratio, and in a case where the ellipse ratio is the upper limit threshold or lower limit threshold, the driving frequency determining unit 209 determines the driving frequency in accordance with the first deviation.

In the steady speed period B, the driving frequency determining unit 209 determines the driving frequency of the AC signals in accordance with the first deviation. The phase difference does not have to be changed at this time. The pulse duty of AC signal generating signals may be determined in accordance with the second deviation in the acceleration period A and steady speed period B.

Next, confirmation is made regarding whether or not the deceleration period (S107). The periods A through D for the command position are set by time as illustrated in FIG. 5, so determination of whether the deceleration period can be made by detecting the time from starting driving. Also, the amount of movement of the vibration type actuator according to the command position can be compared with the previous time, and determination can be made regarding whether or not the amount of movement is less than the previous time. In a case of having reached the deceleration period, the final target stopping position and detection position are compared, and the second deviation is calculated (S108). In the deceleration period C, the driving frequency and phase difference of AC signals are set by position feedback control such as PID control, in accordance with the first deviation. Specifically, the driving frequency determining unit 209 determines the driving frequency of the AC signals in accordance with the first deviation. After the driving frequency is increased and the driving speed of the vibrating member 202 is reduced, so where the driving speed is decelerated to a certain value, the ellipse ratio determining unit 208 changes the phase difference from the upper limit threshold or lower limit threshold, decelerating the driving speed. Reducing the absolute value of the phase difference at this time reduces the driving speed.

The pulse duty is then set in accordance with the second deviation (S109). The pulse duty is set to a value larger than 0, from the absolute value of the second deviation, using a look-up table in which second deviations and corresponding pulse duties are set beforehand. The smaller the second deviation is, the smaller the pulse duty is set to be, and conversely the larger the second deviation, and greater the pulse duty. In a case where the driving state of the vibrating member 202 has not yet reached the deceleration period, the driven element 203 is moved to the command position while changing the driving frequency and phase difference the AC signals based on the first deviation between the command position and current position, using position feedback control such as PID control again.

Finally, confirmation is made regarding whether or not the position of the driven element 203 has converged within the target stopping precision of the final target stopping position (S110). In a case where the driven element 203 is within the target stopping precision, the position feedback control such as PID control is stopped and driving is stopped (S111). In a case where the driven element 203 is not within the target stopping precision, the position feedback control such as PID control is used in accordance with the first deviation to move the vibration type actuator to the first target position, and pulse duty is set in accordance with the second deviation.

Next, the effects of having applied the first embodiment will be described with reference to FIGS. 6 and 7. FIG. 6 is a diagram illustrating the relationship between command position and detection position, pulse duty, and driving speed, in a conventional vibration type actuator. FIG. 7 is a diagram illustrating the relationship between command position and detection position, pulse duty, and driving speed, according to the first embodiment.

At the time of starting driving in the conventional example in FIG. 6, the pulse duty to move the vibration type actuator is raised to 50%, which is the upper limit. The driving frequency and phase difference of the AC signals are set by position feedback control such as PID control, in accordance with the deviation between the command positions of the vibration type actuator made up of the acceleration period A, steady speed period B, deceleration period C, and stopping period D, and the detection position. Accordingly, the size and ellipse ratio of the ellipse of elliptical motion is adjusted. In this case, the controllability becomes unstable at the time of focus driving with the vibration type actuator due to the effects of inertia, and following capabilities regarding the command position deteriorate. Accordingly, the deceleration may not be in time when stopping the vibration type actuator and overshooting of the final target stopping position occurs. This requires a backtracking operation in the opposite direction from the focus driving direction by an amount equivalent to the amount of the vibration type actuator overshooting the final target stopping position, so the lead on the vibration type actuator increases. The backtracking operation also increases the amount of time until the driven element 203 converges within the stopping precision of the final target stopping position.

On the other hand, in a case of applying the first embodiment, the pulse duty is set in the deceleration period C, in accordance with the second deviation, which is the deviation between the final target stopping position of the vibration type actuator and the detection position, as illustrated in FIG. 7. The driving frequency and phase difference of the AC signals are set by position feedback control such as PID control, in accordance with the first deviation that is the deviation between the command position of the vibration type actuator and the detection position. Thus, the drive device according to the present embodiment adjust the size and ellipse ratio of the ellipse of elliptical motion in accordance with the first deviation, and adjusts the size of the ellipse of elliptical motion in accordance with the second deviation. That is to say, two control loops, which are a control loop for the command position and a control position relating to the final target stopping position, are used at the same time. Accordingly, the vibrating member 202 can be controlled so that the friction force as to the contact face of the vibrating member 202 gradually becomes larger as to the driving force of the vibrating member 202. Thus, the effects of inertia can be reduced by using control force employing friction, so overshooting the final target stopping position during focus driving can be reduced. That is to say, control is performed taking into consideration the two of sequentially-changing command position and final target stopping position near the target stopping position at the same time, thereby reducing overshooting at the time of stopping at the final target stopping position. Also, the distance necessary for the backtracking operation due to overshooting can be reduced, so convergence within the stopping precision of the final target stopping position can be realized in a short time, and the amount of time until the vibration type actuator comes to a stop can be reduced. Further, the operations when stopping can be controlled to be stable and precise, so the vibrating member 202 (driven element 203) can be stopped at the final target stopping position with a high level of precision.

Second Embodiment

Description will be made in a second embodiment regarding a control method of adjusting by driving frequency the operation amount determined by the deviation as to the final target stopping position when positioning, in a drive device of a driven element where speed control is performed by adjusting the size or ellipse ratio of the ellipse. Other configurations and operations are the same as in the first embodiment, so detailed description will be omitted.

The drive device of the vibrating member according to the present embodiment will now be described with reference to FIGS. 8A and 8B. FIG. 8A is a block diagram of a vibration type actuator and drive device of a vibrating member according to the first embodiment, and FIG. 8B is a circuit diagram of the vibration type actuator and drive device of the vibrating member.

A vibrator 301 has a vibrating member 302 and driven element 303, as illustrated in FIG. 8A. The driven element 303 is driven by elliptical motion excited at the protrusions of the vibrating member 302. A position detecting unit 304 detects the position of the driven element 303, and is configured as a linear encoder, for example. It is sufficient that the position detecting unit 304 be able to detect the relative position of the vibrating member 302 and driven element 303, and in a case where the vibrating member 302 moves for example, detection of the position of the vibrating member 302 is sufficient. The vibrator 301 may be any of an arrangement where the vibrating member 302 moves, where the driven element 303 moves, or where both the vibrating member 302 and driven element 303 move. A case is exemplified in the present embodiment where the driven element 303 moves.

The drive apparatus 300 according to the present embodiment has a control unit 318 and drive unit 319. The control unit 318 is configured to control second AC signals input to the vibrating member 302, based on the relative position of the vibrating member 302 and driven element 303. The drive unit 319 is configured to generate elliptical motion at part of the vibrating member 302, the protrusions in this case, by inputting the second AC signals to the vibrating member 302.

The control unit 318 includes a command position generating unit 305, a first elliptic shape control unit 320 (first control unit), and second elliptic shape control unit (second control unit) 311. The command position generating unit 305 is configured to generate command values relating to a relative position (first target position) of the vibrating member 302 and driven element 303. The command value relating to relative position here is not restricted to a value relating to position, and may be a value relating to speed. The relative position of the vibrating member 302 and driven element 303 can be controlled by drive time and speed, so the relative position can be controlled by controlling the drive speed of the vibrating member 302.

The first elliptic shape control unit 320 is configured to control the amplitude of the elliptical motion in the direction of the vibrating member 302, in accordance with a first deviation that is the difference between the relative position of the vibrating member 302 and driven element 303 and the command value. The second elliptic shape control unit is configured to control the amplitude of the elliptical motion in a direction perpendicular to the driving direction of the vibrating member 302, in accordance with a second deviation that is the difference between the relative position of the vibrating member 302 and driven element 303, and the final target stopping position relating to the relative position.

Signals, relating to deviation between a command value (first target position) that is the output of the command position generating unit 305, and output of the position detecting unit 304, are input to a PID control unit 307. The first target position is a target position of a command that changes every unit time, as indicated by the dotted line in FIG. 3A, for example, and is set for position control, to move the driven element 303 to the final stopping position. The deviation between the detection position of the position detecting unit 304 and the first target position is the first deviation in the present invention, as illustrated in FIG. 3A. The PID control unit 307 computes the operation amount of the vibrator from this first deviation.

The first elliptic shape control unit 320 is connected to the output side of the PID control unit 307. The first elliptic shape control unit 320 has an ellipse ratio determining unit 308 that sets the ratio of the ellipse in the elliptical motion, and a driving frequency determining unit 309 that sets the size of the ellipse in the elliptical motion. The ellipse ratio determining unit 308 determines the ellipse ratio, and the driving frequency determining unit 309 determines the driving frequency, both in accordance with the operation amount output from the PID control unit 307. The ellipse ratio obtained by computation at the ellipse ratio determining unit 308 can be controlled by controlling the phase difference of the first AC signals (AC voltage V1 and V2) input to the piezoelectric element. The output sides of the ellipse ratio determining unit 308 and driving frequency determining unit 309 are connected to an AC signal generating unit 310. Signals relating to the deviation between the second target position that is the output of the final target stopping position generating unit 306 and the output of the position detecting unit 304, are input to an adjustment amount determining unit 311 serving as the second elliptic shape control unit. The upper limit and lower limit of phase difference of AC signals, first target position and first deviation, and second target position and second deviation, are the same as the first embodiment, so detailed description will be omitted.

In a case where the phase difference determined by the ellipse ratio determining unit 308 while driving of the driven element 303 is not at the upper limit threshold or lower limit threshold, the driving frequency determining unit 309 sets the driving frequency to the upper limit. The driving frequency is further adjusted in accordance with eth adjustment amount output from the adjustment amount determining unit 311, and the AC signal generating unit 310 generates two-phase AC signals to having this driving frequency and phase difference.

On the other hand, in a case where the phase difference determined by the ellipse ratio determining unit 308 while driving of the driven element 303 is at the upper limit threshold or lower limit threshold, the driving frequency determining unit 309 determines the driving frequency in accordance with the first deviation and second deviation. The AC signal generating unit 310 generates two-phase AC signals having this driving frequency and phase difference. Note that the upper limit of the driving frequency here means the highest value of driving frequency bands used for driving the driven element 303 or a value close thereto.

That is to say, in the present embodiment the phase difference and driving frequency are determined in accordance with the first deviation, and the driving frequency is adjusted in accordance with the second deviation, thereby controlling the speed of the driven element 303.

The boosting circuit 313 is connected to the output side of the AC signal generating unit 310. The boosting circuit 313 is configured including a coil 315 and transformer 316 as illustrated in FIG. 8B. The boosting circuit 313 boosts the two first AC signals generated by switching at the AC signal generating unit 310 to generate the second AC signals, and applies this to multiple electrodes of the piezoelectric element of the vibrating member 302.

Next, a specific example of control operations according to the second embodiment will be described with reference to FIG. 9. FIG. 9 is a flowchart of control operations when performing focus lens driving of a camera.

As illustrated in FIG. 9, first, AC signals are input and control operations are started (S201). The rate of the pulse duty is set to 50% at this time. Next, the final target stopping position is set (S202). The final target stopping position is the above-described second target position, and is a position L in FIG. 5 where the driven element 303 finally stops when performing control driving of the vibrating member 302. Next, the command position is set (S203). The command position is the above-described first target position. The driving command is set so as to be made up of an acceleration period A where the relative speed of the vibrating member 302 and driven element 303 is accelerated, a steady speed period B where the target speed is maintained, a deceleration period C where the speed is decelerated, and a stopping period D of stopping at the final target stopping position. The command position set every unit time is read in (S204), and this is compared with the detection position of the driven element 303 and the first deviation is calculated (S205). The driven element 303 is sequentially moved to the command position by changing the driving frequency and phase difference of AC signals by position feedback control such as PID control in accordance with this first deviation (S206).

Next, confirmation is made regarding whether or not the deceleration period (S207). The periods A through D for the command position are set by time as illustrated in FIG. 5, so determination of whether the deceleration period can be made by detecting the time from starting driving. Also, the amount of movement of the driven element 303 according to the command position can be compared with the previous time, and determination can be made regarding whether or not the amount of movement is less than the previous time. In a case of the driving state of the driven element 303 having reached the deceleration period, the final target stopping position and detection position are compared, and the second deviation is calculated (S208). The driving frequency is then adjusted by performing change in accordance with the second deviation as to the driving frequency set in S206 (S209). The driving frequency is adjusted using a look-up table set beforehand, based on the second deviation. Adjustment is performed such that the smaller the second deviation is, the more the driving frequency is accelerated, and conversely the larger the second deviation, and more the driving frequency is decelerated. In a case where the deceleration period has not been reached yet, the driven element 303 is moved to the command position while changing the driving frequency and phase difference of the AC signals based on the first deviation between the command position and current position (detection position), using position feedback control such as PID control again.

Finally, confirmation is made regarding whether or not the position of the driven element 303 has converged within the target stopping precision of the final target stopping position (S210). In a case where the driven element 303 is within the target stopping precision, the position feedback control such as PID control is stopped and driving is stopped (S211). In a case where the driven element 303 is not within the target stopping precision, the position feedback control such as PID control is used in accordance with the first deviation to move the driven element 303 to the first target position. Also, the driving frequency is adjusted at this time by performing change of the driving frequency set in S206 in accordance with the second deviation.

In a case of applying the second embodiment, in the same way as with the first embodiment, the size and ellipse ratio of the ellipse of elliptical motion are adjusted in accordance with the first deviation, and the size of the ellipse of elliptical motion is adjusted in accordance with the second deviation. Accordingly, the vibrating member 302 can be controlled so that the friction force as to the contact face of the vibrating member 302 gradually becomes larger as to the driving force of the vibrating member 302. Thus, the effects of inertia can be reduced by using control force employing friction, so overshooting the final target stopping position during focus driving can be reduced. Also, the backtracking operation due to overshooting can be reduced, so convergence within the stopping precision of the final target stopping position can be realized in a short time, and the amount of time until the vibration type actuator comes to a stop can be reduced. Further, the operations when stopping can be controlled to be stable and precise, and thus can be stopped at the final target stopping position with a high level of precision.

Third Embodiment

Description will be made in a third embodiment regarding a control method of fixing the driving frequency during driving control, and performing the operation amount determined by the deviation as to the control position using phase difference and pulse duty, in a drive device of a driven element where speed control is performed by adjusting the size or ellipse ratio of the ellipse. Other configurations and operations are the same as in the first embodiment, so detailed description will be omitted.

Figure 10A:
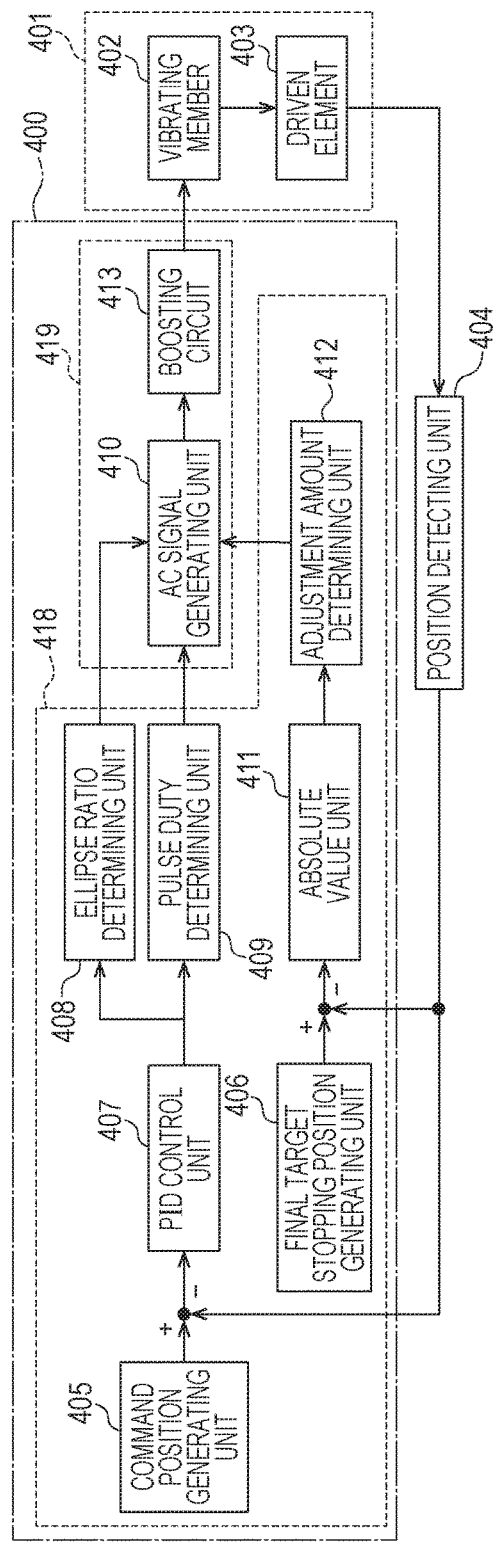
FIG. 10A is a block diagram of a vibration type actuator and drive device of a vibrating member according to a third embodiment.
Figure 10B:
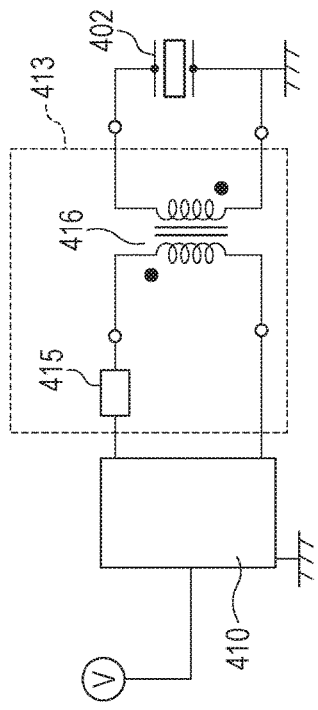
FIG. 10B is a circuit diagram of the vibration type actuator and drive device of the vibrating member according to the third embodiment.

The drive device of the vibrating member according to the present embodiment will now be described with reference to FIGS. 10A and 10B. FIG. 10A is a block diagram of a vibration type actuator and drive device of a vibrating member according to the third embodiment, and FIG. 10B is a circuit diagram of the vibration type actuator and drive device of the vibrating member.

A vibrator 401 has a vibrating member 402 and driven element 403, as illustrated in FIG. 10A. The driven element 403 is driven by elliptical motion excited at the protrusions of the vibrating member 402. A position detecting unit 404 detects the position of the driven element 403, and is configured as a linear encoder, for example. It is sufficient that the position detecting unit 404 be able to detect the relative position of the vibrating member 402 and driven element 403, and in a case where the vibrating member 402 moves for example, detection of the position of the vibrating member 402 is sufficient. The vibrator 401 may be any of an arrangement where the vibrating member 402 moves, where the driven element 403 moves, or where both the vibrating member 402 and driven element 403 move. A case is exemplified in the present embodiment where the driven element 403 moves.

The drive apparatus 400 according to the present embodiment has a control unit 418 and drive unit 419. The control unit 418 is configured to control second AC signals input to the vibrating member 402, based on the relative position of the vibrating member 402 and driven element 403. The drive unit 419 is configured to generate elliptical motion at part of the vibrating member 402, the protrusions in this case, by inputting the second AC signals to the vibrating member 402.

The control unit 418 includes a command position generating unit 405, a first elliptic shape control unit 420 (referred to as a first control unit), and second first elliptic shape control unit (adjustment amount determining unit 412, referred to as a second control unit). The command position generating unit 405 is configured to generate command values relating to a relative position (first target position) of the vibrating member 402 and driven element 403. The first elliptic shape control unit 420 is configured to control the amplitude of the elliptical motion in the direction of the vibrating member 402, in accordance with a first deviation that is the difference between the relative position of the vibrating member 402 and driven element 403 and the command value. The second elliptic shape control unit is configured to control the amplitude of the elliptical motion in a direction perpendicular to the driving direction of the vibrating member 402, in accordance with a second deviation that is the difference between the relative position of the vibrating member 402 and driven element 403, and the final target stopping position relating to the relative position.

Signals, relating to deviation between a command value (first target position) that is the output of the command position generating unit 405, and output of the position detecting unit 404, are input to a PID control unit 407. The first target position is a target position of a command that changes every unit time, as indicated by the dotted line in FIG. 3A, for example, and is set for position control, to move the driven element 403 to the final stopping position.

The deviation between the detection position of the position detecting unit 404 and the first target position is the first deviation in the present embodiment, as illustrated in FIG. 3A. The PID control unit 407 computes the operation amount of the vibration type actuator from this first deviation.

The first elliptic shape control unit 420 is connected to the output side of the PID control unit 407. The first elliptic shape control unit 420 has an ellipse ratio determining unit 408 that sets the ratio of the ellipse in the elliptical motion, and a pulse duty determining unit 409 that sets the size of the ellipse in the elliptical motion. The ellipse ratio determining unit 408 determines the ellipse ratio, and the pulse duty determining unit 409 determines the pulse duty, both in accordance with the operation amount output from the PID control unit 407. The ellipse ratio obtained by computation at the ellipse ratio determining unit 408 can be controlled by controlling the phase difference of the second AC signals (AC voltage V1 and V2) input to the piezoelectric element. The output sides of the ellipse ratio determining unit 408 and driving frequency determining unit 409 are connected to an AC signal generating unit 410. The AC signal generating unit 410 can serve as a circuit generating first AC signals by switching, for example.

Signals relating to the deviation between the second target position that is the output of the final target stopping position generating unit 406 and the output of the position detecting unit 404, are input to an adjustment amount determining unit 411. Further connected to the output side of the absolute value unit 411 is an adjustment amount determining unit 412, serving as the second elliptic shape control unit. The adjustment amount determining unit 412 determines the adjustment amount of pulse duty from the signals output from the absolute value unit 411. The upper limit and lower limit of phase difference of AC signals, first target position and first deviation, and second target position and second deviation, are the same as the first embodiment, so detailed description will be omitted.

In a case where the phase difference determined by the ellipse ratio determining unit 408 while driving of the driven element 403 is not at the upper limit threshold or lower limit threshold, the pulse duty determining unit sets the pulse duty to the lower limit. The pulse duty is further adjusted in accordance with the adjustment amount output from the adjustment amount determining unit 412, and the AC signal generating unit 410 generates two first AC signals to having this pulse duty and phase difference. On the other hand, in a case where the phase difference determined by the ellipse ratio determining unit 408 while driving of the driven element 403 is at the upper limit threshold or lower limit threshold, the pulse duty determined by the pulse duty determining unit 409 is used. Accordingly, the AC signal generating unit 410 generates two first AC signals having this pulse duty and phase difference. Note that the lower limit of the pulse duty here means the lowest value in the range of pulse duty used for driving the vibrating member 402 or a value close thereto.

That is to say, in the present embodiment, the phase difference and pulse duty of the AC signals are determined in accordance with the first deviation, and the pulse duty is adjusted in accordance with the second deviation, thereby controlling the speed of the driven element 403.

The boosting circuit 413 is connected to the output side of the AC signal generating unit 410. The boosting circuit 413 is configured including a coil 415 and transformer 416 as illustrated in FIG. 10B. The boosting circuit 413 boosts the two first AC signals generated by switching at the AC signal generating unit 410 to generate two second AC signals, and applies this to multiple electrodes of the piezoelectric element of the vibrating member 402.

Figure 11:
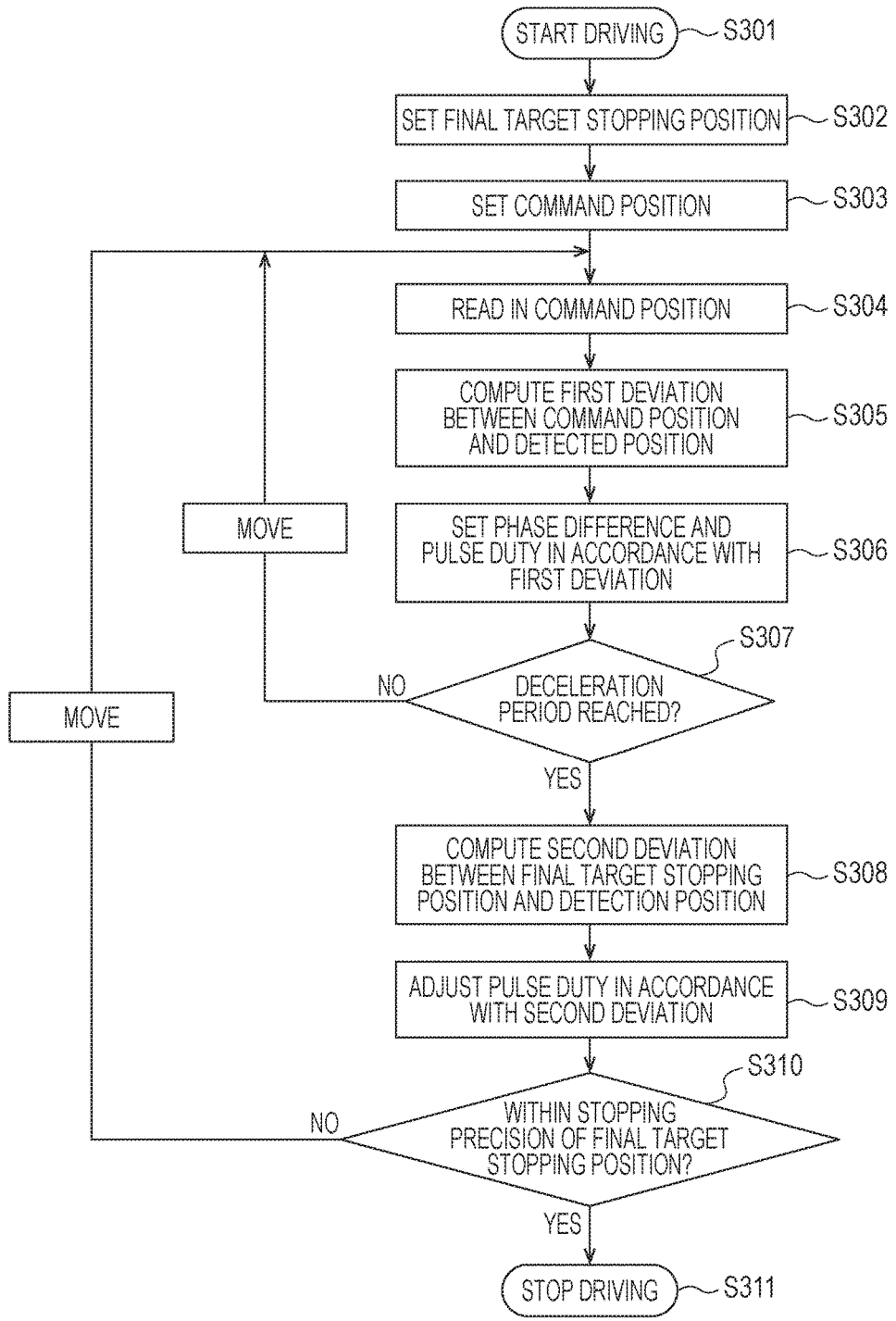
FIG. 11 is a flowchart according to the third embodiment.

Control operations according to the third embodiment will be described with reference to FIG. 11. FIG. 11 is a flowchart of control operations of the drive device when performing focus lens driving of a camera.

As illustrated in FIG. 11, first, second AC signals are input and control operations are started (S301). The driving frequency is fixed at this time and operations are started. Next, the final target stopping position is set (S302). The final target stopping position is the above-described second target position, and is a position L in FIG. 5 where the driven element 403 finally stops when performing control driving. Next, the command position is set (S303). The command position is the above-described first target position, and is set so as to be made up of an acceleration period A where the relative speed of the vibrating member 402 and driven element 403 is accelerated, a steady speed period B where the target speed is maintained, a deceleration period C where the speed is decelerated, and a stopping period D of stopping at the final target stopping position, as illustrated in FIG. 5. The command position set every unit time is read in (S304), and this is compared with the detection position of the driven element 403 and the first deviation is calculated (S305). The driven element 403 is sequentially moved to the command position by changing the phase difference and pulse duty of AC signals by position feedback control such as PID control in accordance with this first deviation (S306). Next, confirmation is made regarding whether or not the deceleration period (S307). The periods A through D for the command position are set by time as illustrated in FIG. 5, so determination of whether the deceleration period can be made by detecting the time from starting driving. Also, the amount of movement of the driven element 303 according to the command position can be compared with the previous time, and determination can be made regarding whether or not the amount of movement is less than the previous time. In a case of the driving state of the vibrating member 402 having reached the deceleration period, the final target stopping position and detection position are compared, and the second deviation is calculated (S308). The pulse duty is then adjusted by performing change in accordance with the second deviation as to the driving frequency set in S306 (S309). The pulse duty is adjusted using a look-up table set beforehand, based on the absolute value of the second deviation. The smaller the second deviation is, the more the pulse duty is reduced, and conversely the larger the second deviation, and more the pulse duty is increased. In a case where the driving state of the vibrating member 402 has not reached the deceleration period yet, the driven element 403 is moved to the command position while changing the phase difference and pulse duty of the AC signals based on the first deviation which is the difference between the command position and current position (detection position), using position feedback control such as PID control again.

Finally, confirmation is made regarding whether or not the position of the driven element 403 has converged within the target stopping precision of the final target stopping position (S310). In a case where the driven element 403 is within the target stopping precision, the position feedback control such as PID control is stopped and driving is stopped (S311). In a case where the driven element 403 is not within the target stopping precision, the position feedback control such as PID control is used in accordance with the first deviation to move the driven element 403 to the first target position, and the pulse duty is adjusted in accordance with the second deviation as to the pulse duty set in S306.

In a case of applying the third embodiment, in the same way as with the first embodiment, the size and ellipse ratio of the ellipse of elliptical motion are adjusted in accordance with the first deviation, and the size of the ellipse of elliptical motion is adjusted in accordance with the second deviation. Accordingly, the vibrating member 302 can be controlled so that the friction force as to the contact face of the vibrating member 402 gradually becomes larger as to the driving force of the vibrating member 402. Thus, the effects of inertia can be reduced by using control force employing friction, so overshooting the final target stopping position during focus driving can be reduced. Also, the backtracking operation due to overshooting can be reduced, so convergence within the stopping precision of the final target stopping position can be realized in a short time, and the amount of time until the vibration type actuator comes to a stop can be reduced. Further, the operations when stopping can be controlled to be stable and precise, and thus can be stopped at the final target stopping position with a high level of precision.

Fourth Embodiment

Description will be made in a fourth embodiment regarding a drive device of a vibrating member where speed control is performed by adjusting the size or ellipse ratio of the ellipse, where the electrode pattern of the piezoelectric element is different from that in the first through third embodiments. Other configurations and operations are the same as in the first embodiment, so detailed description will be omitted.

Figure 12:
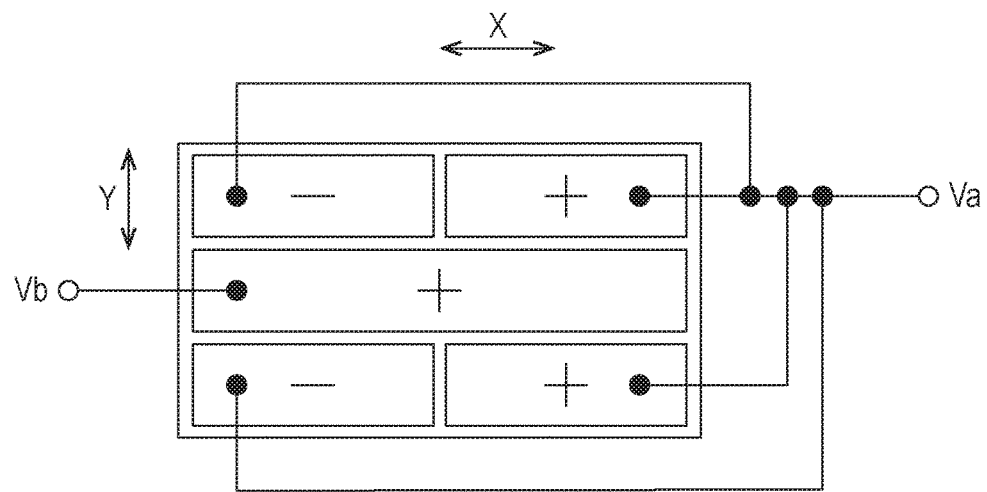
FIG. 12 is an electrode pattern diagram of a piezoelectric element according to a fourth embodiment.

The configuration of a vibrating member according to the fourth embodiment will be described with reference to FIG. 12. FIG. 12 illustrates an electrode pattern of piezoelectric elements of a vibration type actuator according to the fourth embodiment.

In the present embodiment, electrodes are provided on the elastic member 1 in the form of an electrode pattern to generate each of secondary flexural vibration in the longitude direction and primary flexural vibration in the lateral direction. The vibrating member according to the present embodiment is configured such that the larger the voltage applied to an electrode is, the larger the generated vibration. The symbols "+" and "−" in FIG. 12 indicate polarity.

Four electrode regions of the piezoelectric element illustrated in FIG. 12 where voltage signal Va is input are electrode regions to generate secondary flexural vibration in the longitudinal direction. Applying AC voltage of a driving frequency near the resonance frequency of secondary flexural vibration in the longitudinal direction as Va causes the two electrode regions (piezoelectric elements) polarized to "+" out of the four electrode regions to be extended at a certain instant. On the other hand, the two electrode regions (piezoelectric element) polarized to "−" shrink.

Also, at a different instant, the two electrode regions (piezoelectric elements) polarized to "+" shrink, and the two electrode regions (piezoelectric element) polarized to "−" extend. As a result, secondary flexural vibration in the longitudinal direction is generated.

On the other hand, the one electrode region to which voltage signal Vb is input, of the piezoelectric elements illustrated in FIG. 12, is an electrode regions to generate primary flexural vibration in the lateral direction. Applying AC voltage of a driving frequency near the resonance frequency of primary flexural vibration in the lateral direction as Vb causes the middle portion of the piezoelectric element to extend and shrink in the lateral direction of the piezoelectric element (Y direction), so primary flexural vibration occurs in the lateral direction in the vibrating member. The AC voltages Va and Vb here are of the same driving frequency, with the phase shifted 90°, thereby generating elliptical motion at the protrusion 3. In this configuration, the AC voltage ratio of Va and Vb is the ratio of the amplitude of pushing the vibrating member and driven element away from each other and the amplitude in the moving direction of the driven element. Accordingly, the amplitude ratio of the ellipse generated at the contact portion can be changed by changing the voltage ratio between Va and Vb.

The piezoelectric element electrode pattern of described in the fourth embodiment can be used in the vibrating member of the vibration type actuator according to any of the first through third embodiments. In this case, in the same way as in the first embodiment, the size and ellipse ratio of the ellipse of elliptical motion are adjusted in accordance with the first deviation, and additionally, the size of the ellipse of elliptical motion is adjusted in accordance with the second deviation. Accordingly, the vibrating member can be controlled so that the friction force at the face of contact of the driven element and vibrating member gradually becomes larger as to the driving force of the vibrating member. Thus, the effects of inertia can be reduced by using control force employing friction, so overshooting the final target stopping position during focus driving can be reduced. Also, the backtracking operation due to overshooting can be reduced, so convergence within the stopping precision of the final target stopping position can be realized in a short time, and the amount of time until the vibration type actuator comes to a stop can be reduced. Further, the operations when stopping can be controlled to be stable and precise, and thus can be stopped at the final target stopping position with a high level of precision.

Fifth Embodiment

Figure 19:
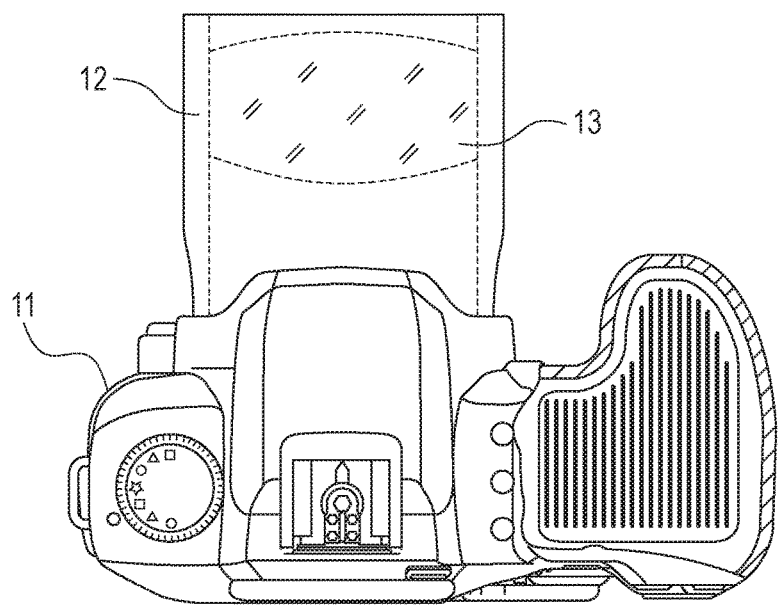
FIG. 19 is a plan view of a camera configured where the drive device to which the present invention has been applied is detachably mountable.

An example of application of the driving circuit of the vibrating member shown in the first through fourth embodiments will be described as a fifth embodiment. For example, the drive device of the vibrating member and vibration type actuator according to the present invention can be used for lens driving in an imaging apparatus. The imaging apparatus illustrated in FIG. 19 has a camera body 11 that includes an imaging device and operating buttons, omitted from illustration, and a lens barrel 12 detachably mountable to the camera body 11. The lens barrel 12 has a focusing lens 13 and a drive device thereof. The drive device may have the drive device of the vibrating member, position detecting device, and so forth, described in the first through fourth embodiments. The imaging device is disposed on the optical axis of the focusing lens 13, and the vibrating member drives a lens holder holding the focusing lens 13. Using the drive device of the vibrating member described in any one of the first through fourth embodiments enables focal operations of the focus lens to be performed stably and precisely, and an imaging apparatus capable of speedy and accurate focal operations can be provided.

Also note that the drive device of the vibrating member and the vibration type actuator according to the present invention is not restricted to imaging apparatus, and can be used for driving stages, such as for driving a stage of a microscope or the like, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-140855, filed Jul. 14, 2015, which is hereby incorporated by reference herein in its entirety.

What is claimed is:

1. A drive device of a driven element, comprising:
a control unit comprising a command position generating unit configured to generate a command value relating to a relative position of a vibrating member to a driven element; and
a drive unit configured to generate an elliptical motion at a part of the vibrating member, by input of AC signals to an electro-mechanical energy conversion element of the vibrating member,
wherein the control unit includes
a first control unit configured to control at least one of phase and frequency of the AC signals, in accordance with a first deviation between the command value and the relative position, and
a second control unit configured to control at least one of pulse duty of signals converted into the AC signals and frequency of the AC signals, in accordance with a second deviation between a target stopping position of the relative position and the relative position.

2. The drive device of a driven element according to claim 1,
wherein the first control unit is configured to further control the amplitude of the elliptical motion in the direction perpendicular to the driving direction of the driven element by controlling phase and frequency of the AC signals.

3. The drive device of a driven element according to claim 1,
wherein the command position generating unit is configured to set the command value at each predetermined time during control operations of the drive device.

4. The drive device of a driven element according to claim 1, further comprising:
a target stopping position generating unit configured to determine the target stopping position,
wherein the second control unit is configured to perform the control based on deviation between the relative position and output of the target stopping position generating unit.

5. The drive device of a driven element according to claim 1,
wherein at least one of the command values is set between a position of starting control of the vibrating member and the target stopping position.

6. The drive device of a driven element according to claim 1, further comprising:
a position detecting unit configured to detect the position of the driven element,
wherein the second deviation is obtained from the output of the position detecting unit and the target stopping position.

7. The drive device of a driven element according to claim 1, further comprising:
a position detecting unit configured to detect the position of the vibrating member,
wherein the second deviation is obtained from the output of the position detecting unit and the target stopping position.

8. The drive device of a driven element according to claim 1,
wherein the AC signals are signals that excite the elliptical motion at part of the vibrating member by generating two flexural vibrations in the vibrating member.

9. A vibration type actuator comprising:
the vibrating member;
the driven element, coming into contact with part of the vibrating member; and
the drive device according to claim 1,
wherein the vibrating member includes
the electro-mechanical energy conversion element, and
an elastic member to which the electro-mechanical energy conversion element is fixed.

10. The vibration type actuator according to claim 9,
wherein the electro-mechanical energy conversion element has two electrodes,
wherein the two electrodes are configured such that a first vibration mode is excited at the vibrating member when AC signals of the same phase are input to the two electrodes, and that a second vibration mode is excited at the vibrating member when AC signals of opposite phase are input to the two electrodes,
wherein the elliptical motion is generated at part of the vibrating member by combining the first vibration mode and the second vibration mode, and
wherein the relative position of the vibrating member to the driven element is changed by the elliptical motion.

11. The vibration type actuator according to claim 9,
wherein the electro-mechanical energy conversion element includes a first electrode that generates the first vibration mode in the vibrating member when the AC signals are input, and a second electrode that generates the second vibration mode,
and wherein the elliptical motion is generated at part of the vibrating member by combining the first vibration mode and the second vibration mode, and the relative position of the vibrating member to the driven element is changed by the elliptical motion.

12. An imaging apparatus, comprising:
a lens;
an imaging device provided on an optical axis of the lens; and
the vibration type actuator according to claim 9, configured to drive the lens.

13. A drive device of a driven element, comprising:
a control unit comprising a command position generating unit configured to generate a command value relating to a relative position of a vibrating member to a driven element; and
a drive unit configured to generate an elliptical motion at a part of the vibrating member, by input of AC signals to an electro-mechanical energy conversion element of the vibrating member,
wherein the control unit includes
a first control unit configured to control amplitude of the elliptical motion in the driving direction of the vibrating member, in accordance with a first deviation between the command value and the relative position, and
a second control unit configured to control amplitude of the elliptical motion in a direction perpendicular to the driving direction of the driven element, in accordance with a second deviation between a target stopping position of the relative position and the relative position.

14. The drive device of a vibrating member according to claim 13,
wherein the first control unit is configured to control amplitude in the driving direction of the vibrating member, by controlling at least one of phase and frequency of the AC signals.

15. The drive device of a vibrating member according to claim 13,
wherein the second control unit is configured to control amplitude of the elliptical motion in a direction perpendicular to the driving direction of the vibrating member, by controlling pulse duty of signals converted into the AC signals.

16. The drive device of a vibrating member according to claim 13,
wherein the second control unit is configured to control amplitude of the elliptical motion in a direction perpendicular to the driving direction of the vibrating member, by controlling frequency of the AC signals.

17. The drive device of a vibrating member according to claim 13,
wherein the first control unit is configured to further control the amplitude of the elliptical motion in the direction perpendicular to the driving direction of the driven element by controlling phase and frequency of the AC signals.

18. The drive device of a vibrating member according to claim 13,
wherein the command position generating unit is configured to set the command value at each predetermined time during control operations of the drive device.

19. The drive device of a vibrating member according to claim 13,
a target stopping position generating unit configured to determine the target stopping position,
wherein the second control unit is configured to perform the control based on deviation between output of the target stopping position generating unit and the relative position.

20. The drive device of a vibrating member according to claim 13,
wherein at least one of the command values is set between a position of starting control of the vibrating member and the target stopping position.

21. The drive device of a vibrating member according to claim 13,
wherein the AC signals are signals that excite the elliptical motion at part of the vibrating member by generating two flexural vibrations in the vibrating member.

22. A vibration type actuator comprising:
the vibrating member;
the driven element, coming into contact with part of the vibrating member; and
the drive device according to claim 13,
wherein the vibrating member includes
the electro-mechanical energy conversion element, and
an elastic member to which the electro-mechanical energy conversion element is fixed.

23. The vibration type actuator according to claim 22,
wherein the electro-mechanical energy conversion element has two electrodes,
wherein the two electrodes are configured such that a first vibration mode is excited at the vibrating member when AC signals of the same phase are input to the two electrodes, and that a second vibration mode is excited at the vibrating member when AC signals of opposite phase are input to the two electrodes, and wherein the elliptical motion is generated at part of the vibrating member by combining the first vibration mode and the second vibration mode, and the relative position of the vibrating member to the driven element is changed by the elliptical motion.

24. An imaging apparatus, comprising:
a lens;
an imaging device provided on an optical axis of the lens; and
the vibration type actuator according to claim 22, configured to drive the lens.

* * * * *